United States Patent [19]

Ballard, Jr.

[11] 4,135,936

[45] Jan. 23, 1979

[54] GLASS-CERAMIC COMPOSITION FOR HERMETIC SEALS

[75] Inventor: Clifford P. Ballard, Jr., Albuquerque, N. Mex.

[73] Assignee: The United States of America as represented by the United States Department of Energy, Washington, D.C.

[21] Appl. No.: 916,398

[22] Filed: Jun. 16, 1978

[51] Int. Cl.$^2$ .................. C03C 3/22; C03C 3/04; C03C 3/30
[52] U.S. Cl. .................. 106/39.6; 106/39.7
[58] Field of Search .................. 106/39.6, 39.7

[56] References Cited

U.S. PATENT DOCUMENTS

| | | | |
|---|---|---|---|
| 3,022,179 | 2/1962 | Morrissey | 106/39.7 |
| 3,804,608 | 4/1974 | Gaskell et al. | 106/39.7 |
| 3,837,978 | 9/1974 | Basdiecker | 106/39.6 |
| 3,953,220 | 4/1976 | Muller | 106/39.6 |
| 3,957,496 | 5/1976 | Eagan | 106/39.8 |

*Primary Examiner*—O. R. Vertiz
*Assistant Examiner*—Mark Bell
*Attorney, Agent, or Firm*—Dean E. Carlson; Dudley W. King; Robert Southworth, III

[57] ABSTRACT

The invention relates to a glass-ceramic composition having a high fracture strength adaptable for hermetically sealing to chromium bearing iron or nickel base alloys at temperatures of between about 950° C to about 1100° C to form a hermetically sealed insulator body, comprising from about 55 to about 65 weight percent $SiO_2$, from about 0 to about 5 weight percent $Al_2O_3$, from about 6 to about 11 weight % $Li_2O$, from about 25 to about 32 weight percent BaO, from about 0.5 to about 1.0 weight percent CoO and from about 1.5 to about 3.5 weight percent $P_2O_5$.

3 Claims, 2 Drawing Figures

Fig. I

GLASS-CERAMIC COMPOSITION FOR HERMETIC SEALS

BACKGROUND OF INVENTION

The invention relates to a glass-ceramic composition having a high fracture strength and especially suitable for sealing to chromium bearing iron or nickel base alloys.

In applications requiring the passing of electrical leads through an insulator wall such as in a vacuum tube or an explosive actuator, there are problems in achieving a good seal between the insulator and the metal, mismatches of thermal expansivity, and a need for a high strength material to withstand high stresses. In the past, in designing seals for stainless steel or the like, designers have been restricted to either directly sealing to glass or to brazing to a ceramic member. In sealing to glass, a special process was required to preoxidize the surface of the steel such it would be wet by the molten glass. In sealing to ceramic it was generally necessary to machine the fired ceramic to a desired configuration and utilize multiple firings to deposit the braze material on the ceramic and metal surfaces to be sealed. These multiple step processes generally were difficult to accomplish and economically undesirable.

SUMMARY OF THE INVENTION

In view of the above limitations and drawbacks, it is an object of this invention to provide a glass-ceramic composition that may be sealed directly to stainless steel without necessitating further seal materials to form a thermal expansion gradient between the ceramic and the metal.

It is a further object of this invention to provide a glass-ceramic that may be directly sealed to chromium bearing iron or nickel based alloys.

It is a further object of this invention to provide an improved glass-ceramic composition for an insulator body to form ceramic to metal seals that reduces or minimize the above cited limitations.

It is a still further object to provide a glass-ceramic composition that forms high strength seals with metals.

The invention comprises a glass-ceramic composition useful for insulator body hermetic sealing to a metal, the composition including silicon dioxide ($SiO_2$), aluminum oxide ($Al_2O_3$) (optional), lithium oxide ($Li_2O$), barium oxide (BaO), cobalt oxide (CoO), and phosphorous pentoxide ($P_2O_5$). These may be from about 55 to 65 weight percent (wt. %) $SiO_2$, from about 0 to 5 wt. % $Al_2O_3$, from about 6 to 11 wt. % $Li_2O$, from about 25 to 32 wt. % BaO, from about 0.5 to 1.0 wt. % CoO, and from about 1.5 to 3.5 wt. % $P_2O_5$.

DESCRIPTION OF DRAWINGS

Other objects and advantages of the present invention will be apparent to those skilled in the art from the following description and wherein.

DETAILED DESCRIPTION

Figure 1:
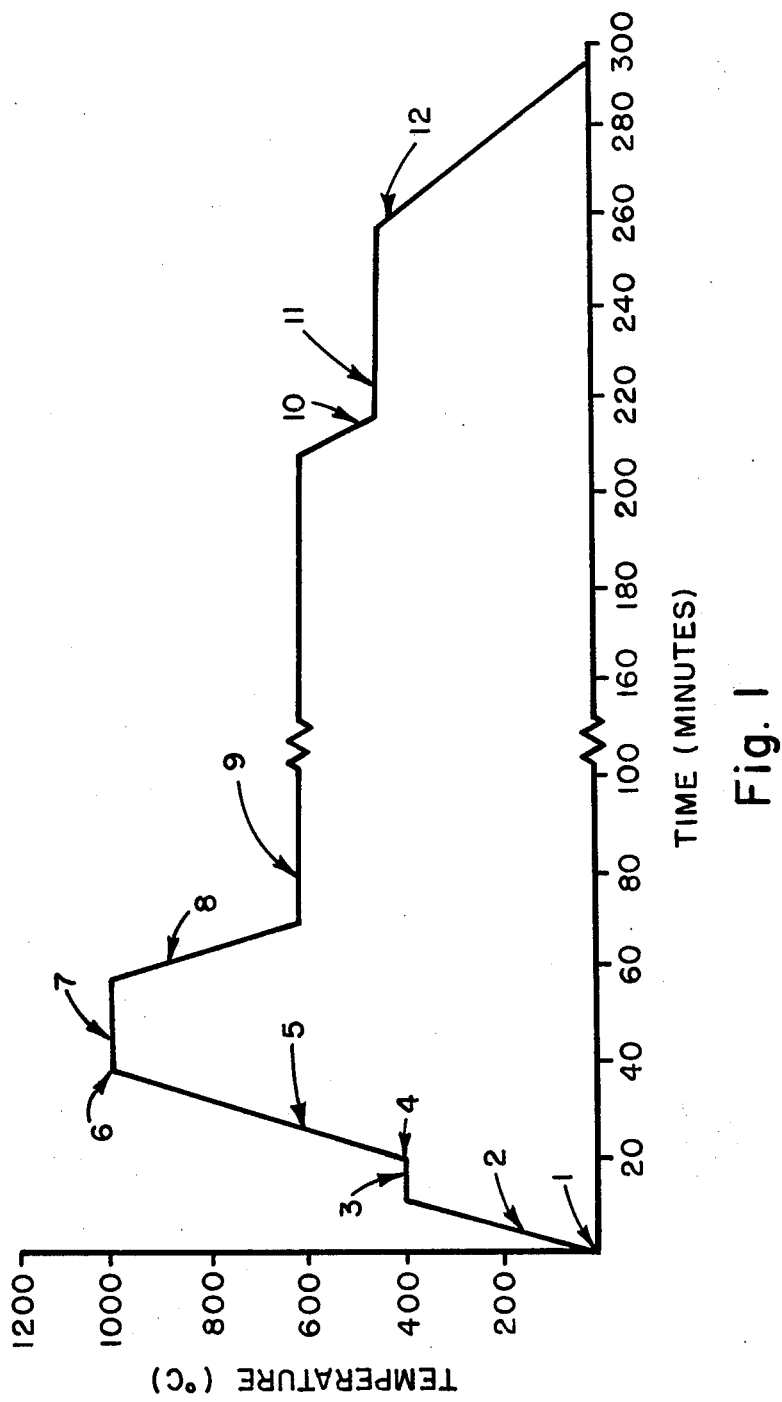
FIG. 1 illustrates a temperature schedule used in producing the glass-ceramic metal seal in accordance with the invention.

The glass-ceramics of this invention have constituents of $SiO_2$, $Al_2O_3$ (optional), $Li_2O$, BaO, CoO, and $P_2O_5$, with the constituents at weight percents of from about 55 to 65 wt. % $SiO_2$ from about 0 to 5 wt. % $Al_2O_3$, from about 6 to 11 wt. % $Li_2O$, from about 25 to 32 wt. % BaO, from about 0.5 to 1.0 wt. % CoO, from about 1.5 to 3.5 wt. % $P_2O_5$. A particular example of the glass-ceramic composition of this invention is 60 wt. % $SiO_2$, 9 wt. % $Li_2O$, 28.5 wt. % BaO, 0.5 wt. % CoO, and 2 wt. % $P_2O_5$.

The formation of a glass-ceramic involves melting the raw materials to form a glass, annealing the glass then heat treating it to induce nucleation and crystallization. The melting temperature may be determined by observation of the glass during melting. To obtain a stress-free glass preform for subsequent use, the glass is annealed by holding it a specified temperature such as from about 430° C. to about 458° C. and preferably at 440° and then cooled slowly to avoid imposing thermal gradients which could result in substantial residual stress in the glass at room temperature. Cooling may be effected at an appropriate temperature such as, for example, 4° C. per minute. The cooling rate selected will be dependent upon the size of the part being cooled, and larger parts may require a slower cooling rate than small parts. The annealing temperature should be desirably and accurately maintained when annealing glass-ceramics because the nucleation temperature under certain conditions may be close to the annealing temperature. The annealing temperature, approximate nucleating temperature, and crystallization temperature may be determined by differential thermal analysis as is known in the art.

While there are various ways or procedures that may be employed in preparing the glass-ceramics of this invention, one that may be used is that of premixing the ingredients followed melting at above 1000° C. and preferably at about 1550° C. in a suitable heating means such as an electric furnace. To insure homogeneity the glass may be stirred continuously, in some instances for up to 18 hours during heating and melting.

The molten glass, after heating and melting may be cast, vacuum drawn, pressed, or extruded into preforms of desired shape using suitable mold materials such as graphite or steel coated with graphite powder mold release. After forming, the preforms should be promptly transferred to an annealing oven preheated to from about 430° C. to 455° C. and preferably at 440° C. and held at this temperature for approximately 1 hour and then cooled to room temperature at a suitable rate such as about 4° C. per minute. Alternatively, this glass can be extruded or pressed while in the molten state into contact with appropriate metal piece parts to form subassemblies with embedded metal parts.

The preform is then contacted with a metal under a temperature at from about 950° C. to 1100° C. for about 20 minutes to form a hermetic seal with the metal. The metal may be a chromium bearing iron alloy such as 21-6-9 stainless steel (Armco) or a chromium bearing nickel alloy such as Inconel 718 (International Nickel). The seal between the glass-ceramic and these metals is believed to be a result of chemical reduction of cobalt oxide in the glass by the chromium in the alloy to form chromium oxide. This reaction produces an adherent chrome oxide coating on the surface of the metal parts which promotes glass wetting of the metal surfaces and enhances chemical bonding of the glass-ceramic to the metal. The addition of from about 0.5 to 1.0 and preferably 0.5 wt. % CoO has been found to be beneficial in promoting this chemical bond.

The glass is then devitrified by cooling to from about 600° C. to 700° C. and holding at that temperature for about 0.5 to about 2.5 hours. The devitrified crystals may grow either from nuclei on the surface of the glass preform or on nuclei embedded within the glass matrix. It has been found that it is beneficial to add from about 1.5 wt. % to about 3.5 wt. % and preferably 2.0 wt. % phosphorous pentoxide to the glass so as to form nuclei about which crystallization can take place.

It is believed that the crystals are those of $Li_2Si_2O_5$, $Li_2SiO_3$, alpha-$BaSi_2O_5$, and $BaSi_3O_8$. Appropriate proportions of ingredients to form these crystals have been found to be from about 55 to 65 and preferably 60 wt. % $SiO_2$, from about 6 to 11 and preferably 9 wt. % $Li_2O$ and from about 25 to 32 and preferably 28.5 wt. % BaO.

In a metal-glass-ceramic sealed device, such as a pyrotechnic actuator as hereinafter described, the seal may be pressurized due to actuator detonation or gaseous release. The resulting shear and tensile stress could cause fracture of the glass-ceramic, fracture of the interface bond, or deformation of the metal housing, causing stress concentration and fracture of the glass-ceramic. Once a fracture is initiated, the tough glass-ceramic inhibits propagation of that fracture by blunting the fracture tip and necessitating circumvention around particles of the included crystalline phases. By causing the fracture to take an arduous path through the glass-ceramic, the fracture toughness of the insulator is significantly increased over typical sealing glasses.

Figure 2:
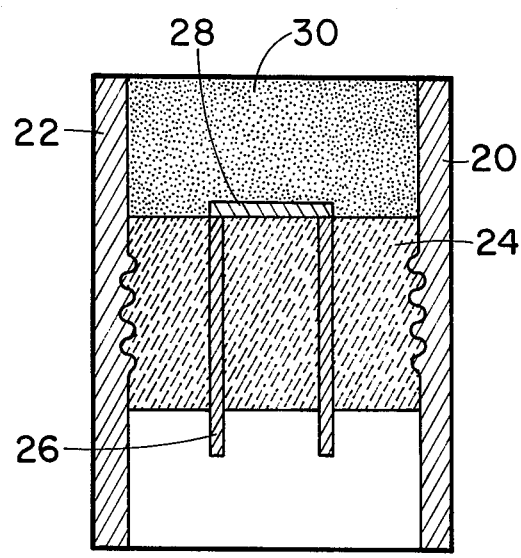
FIG. 2 illustrates in cross section an exemplary glass-ceramic insulator body sealed to a stainless steel sleeve.

Reference is now made to FIG. 2 which illustrates in cross section an exemplary glass-ceramic insulating body sealed to a stainless steel sleeve. A pyrotechnic actuator 20 is depicted in this figure but it will be apparent to those skilled in the art that this seal could be utilized in other devices such as vacuum tubes or gas tubes. An alloy housing 22 is sealed as previously described to a glass-ceramic insulator 24. The alloy of the housing may be a chromium bearing iron or nickel based alloy such as 21-6-9 stainless steel (Armco) or Inconel 718 (International Nickel). It has been found that if the material of the housing has a somewhat greater coefficient of thermal expansion than the glass-ceramic (Table I), compressive forces will be generated which cause the glass-ceramic insulator to be more tightly gripped.

TABLE I

| Material | Thermal Expansivity |
| --- | --- |
| glass-ceramic | $1.04 \times 10^{-5}/°$ C |
| 52% iron/ 48% nickel | 1.03 |
| Inconel-718 | 1.48 |
| 21-6-9 stainless steel | 1.94 |

Passing through the body of the insulator are lead wires 26. It has been found that it is acceptable to use lead wires of 52 wt. % iron and 48% nickel. This alloy does not have the chromium required by the hereinabove mentioned theory for chemical bonding, so only physical bonding takes place. This alloy does have a similar coefficient of thermal expansion to that of the glass-ceramic (Table I) so that its use is suitable for physically-sealed lead wires. Attached to the lead wires is bridge wire 28 for ignition of pyrotechnic composition 30 as is well known in the art.

EXAMPLE

A glass batch was prepared by mixing 600 grams of $SiO_2$, 222.8 grams of $Li_2CO_3$, 362.3 grams of $BaCO_3$, 32.4 grams of $NH_4H_2PO_4$, and 5.3 grams of $Co_3O_4$ powders in a V-blender for 3 hours. This proportion of constituents was calculated to produce a glass product containing 60 weight percent $SiO_2$, 9 weight percent $Li_2O$, 28.5 weight percent BaO, 2.0 weight percent $P_2O_5$, and 0.5 weight percent CoO.

The batch was melted at 1550° C. and then stirred for 18 hours at 1500° C. The glass was then cast into cylindrical preform shapes in a graphite mold and annealed at 440° C. for 1 hour before cooling to room temperature.

A glass preform was inserted into a tubular piece made of 21-6-9 stainless steel (Armco) which was then placed in a vacuum furnace. The piece was then subjected to the following sealing schedule and as illustrated in FIG. 1:

1. Evacuate furnace to $10^{-5}$ mm Hg.
2. Raise temperature at 33° C./min. to 400° C.
3. Hold at 400° C. for 10 min.
4. Admit argon to bring pressure to 40 mm Hg.
5. Raise temperature at 33° C./min. to 1000° C.
6. Hold at 1000° C. for 10 min.
7. Slowly admit argon for 10 min. to bring pressure to 2 psig, maintaining the temperature of 1000° C. for 20 min.
8. Reduce temperature at 33° C./min. to 600° C.
9. Hold at 600° C. for 2.5 hours.
10. Reduce temperature at 20° C./min. to 475° C.
11. Hold at 475° C. for 1 hour.
12. Reduce temp. at 10° C./min. to below 100° C. before opening furnace.

The resulting glass-ceramic was hermetically sealed to the stainless steel and possessed a coefficient of thermal expansion in a temperature range of from 25° C. to 475° C.; of $1.03 \times 10^{-5}/°$ C. and a modulus of rupture of 13 kpsi. X-ray diffraction data indicated the presence of crystalline species $Li_2Si_2O_5$, $Li_2SiO_3$, alpha-$BaSi_2O_5$, and $Ba_2Si_3O_3$.

The various features and advantages of the invention are thought to be clear from the foregoing description. However, various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. A glass-ceramic of high fracture strength for sealing to chromium bearing iron or nickel base alloys, comprising from about 55 to about 65 weight percent silicon dioxide, from about 0 to about 5 weight percent aluminum oxide, from about 6 to about 11 weight percent lithium oxide, from about 25 to about 32 weight percent barium oxide, from about 0.5 to about 1.0 weight percent cobalt oxide, and from about 1.5 to about 3.5 weight percent phosphorous pentoxide.

2. The glass-ceramic of claim 1 wherein said silicon dioxide is about 60 weight percent, said lithium oxide is about 9 weight percent, said barium oxide is about 28.5 weight percent, said cobalt oxide is about 0.5 weight percent, and said phosphorous pentoxide is about 2 weight percent.

3. The glass-ceramic of claim 1 having a thermal expansion coefficient of about $1.03 \times 10^{-5}/°$ C. from 25° C. to a set point of 475° C. and a modulus of rupture of at least 13 thousand pounds per square inch when heat treated at 600° C. to 700° C. for 0.5 to 2.5 hours.

* * * * *